United States Patent Office 2,851,357
Patented Sept. 9, 1958

2,851,357

ANIMAL FEED EMULSION AND PROCESS

Robert H. Bedford, San Pedro, Calif.

No Drawing. Application April 6, 1956
Serial No. 576,522

15 Claims. (Cl. 99—7)

This invention relates to the treatment of fish, and has particular reference to the production of a fluid, stable homogeneous emulsion consisting of fatty materials and homogenized concentrated fish stickwater or fish hydrolysates and mixtures thereof.

Fatty materials are widely used in the animal feed industry since they possess great energy value and other properties which are biochemically beneficial in the general metabolism of the animal. Similarly, fish materials, such as stickwater concentrate, are well known in the animal feed industry as potent sources of amino acids, peptides and proteins, water soluble vitamins and minerals. Small amounts of fats are also present in these materials.

One of the principal objects of this invention is to provide a process for the production of a fluid, homogeneous emulsion containing both fish materials and fatty materials, the emulsion being stable without phase separation for many months and retaining all the nutritive properties of its components.

It is generally conceded that animal fats which melt at 40–45° C. are less readily digested than the softer or liquid fats, although if the higher melting fats are blended with a liquid fat so that the mixture is completely liquid at lower temperatures, they will be readily absorbed by the animal.

Unsaturated fats are more rapidly assimilated than saturated compounds. For this reason the softer or liquid fats, containing more unsaturated derivatives, are more suitable for edible purposes.

At the present time animal fats such as tallows and greases may be used in animal feeding only to a limited extent, owing to their comparatively high setting point, which is about 40° C. Some of the limitations their use imposes upon the industry are as follows: high temperatures are required to maintain liquefaction; much higher temperatures, about 75° C., are required to ensure maintenance of liquefaction in the pipeline distribution system and even distribution onto the dry feed; expensive heating equipment is required; fire hazards are increased, owing to these high temperatures; and operational problems such as solidification of fats in pipelines, and air pressure or other means required for blowing out lines on shut-down, are presented.

Finally, a fluid, homogeneous emulsion of animal fats alone with fish concentrates is not feasible.

Another object of this invention is to provide animal feed emulsions containing animal fats, the emulsions not being subject to the above-mentioned disadvantages of animal fats.

Other, more specific, objects of this invention are:

(1) To provide a process for the production of an emulsion from aqueous fish concentrates and neutral fats or fatty acids or both.

(2) To provide a process for the production of an emulsion that may be pumped, stored and transported under industrial conditions, and remain phase stable until finally applied to animal feeds.

(3) To provide a process for producing an emulsion which aids in the protection of dry feeds from atmospheric oxidation.

(4) To provide a process for producing an emulsion having the property of wetting ground dry feeds and thus preventing dustiness when handled.

(5) To provide a process for the production of an emulsion of edible fats liquid over a range of temperatures permitting fluidity above the freezing point of the aqueous phase.

(6) To provide a process for the production of an emulsion of liquid fats blended with solid fats which is liquid at a lower temperature than the solid fats.

(7) To provide a process for the production of an emulsion of a mixture of different fats which provide a more extensive choice of fatty acids.

(8) To provide a process for the production of an emulsion to which may be added other nutritive substances, vitamins, and other chemical compounds aiding nutrition, all of which are soluble in the fat or aqueous phases of the emulsion.

Other objects and advantages of this invention it is believed will be readily apparent from the following detailed description of preferred embodiments thereof.

Briefly, this invention comprises a process for producing a fluid emulsion and the product thereof consisting of a mixture of:

(1) Emulsified concentrated fish stickwater or concentrated fish hydrolysates, or a mixture of both in any proportion, herein referred to generically as aqueous fish concentrate;

(2) Fatty materials from vegetable or fish sources, or a mixture of one or both of these with animal fats;

(3) With or without molasses.

The concentrated fish stickwater comprises the liquid obtained from cooked fish, which has been concentrated to about 50% total solids and emulsified to form a stable, homogeneous dispersion of the suspended organic matter in accordance with the process disclosed herein and in my copending application Serial No. 576,521, filed April 6, 1956, on "Homogenization of Fish Products."

The fatty materials are obtained from vegetable seeds or fruit coats, fish muscle, offal and viscera, and animal sources.

The molasses is used for its additional stabilizing influence in maintaining the homogeneity of the emulsion and for its nutritive value.

In carrying out the process of this invention, a slurry of calcium hydroxide or other calcium compound is added to the stickwater or hydrolysate or mixtures thereof, either prior to or after concentration thereof by evaporation to about 50% total solids by weight. The calcium compound forms and stabilizes the homogeneous dispersion of the suspended organic matter of the concentrate. Suitable calcium compounds in addition to calcium hydroxide are calcium chloride, calcium carbonate, calcium acetate, and calcium lactate. Generally, from about 1% to about 2% of calcium hydroxide, or the equivalent amount of calcium in the form of one of the other calcium compounds, based on the dry weight of the solids in the concentrate, is sufficient.

If molasses is used, it is then added to the treated aqueous concentrate and the mixture thoroughly agitated to ensure miscibility. The fatty constituent is then slowly poured into the aqueous mixture and distributed by agitation. If two or more fats are used, they are first blended together and not added separately. Fats which are solid at the operating temperature should be heated just sufficiently to melt them before adding to the liquid fat.

The mixture is then run through a 1/32-inch screen or other filtering medium and then through a homogenizer to produce the final product.

It will be apparent from the above that there are two separate mixing stages for the successful operation of the process. The first is a thorough preliminary mixing of all of the constituents. This premixing is essential in order to ensure stability of the final emulsified product after its passage through the homogenizer. In making laboratory scale preparations, the constituents are thoroughly mixed, poured into a Waring blender and then agitated for three periods of fifteen seconds each with a ten-second interval between each agitation period.

The second stage is the use of the homogenizer itself. This may be done at varying pressures, depending upon whether more than one passage is desired. For laboratory preparations, the premix is passed three times through a hand homogenizer.

The following examples illustrate the process and products of this invention, the process being carried out utilizing the laboratory method specifically referred to above:

Example 1

| | Gm. |
|---|---|
| Tuna and sardine stickwater concentrate | 50.00 |
| Calcium hydroxide | 0.50 |
| Water | 0.75 |
| Crude fish oil | 50.00 |

Example 2

| | Gm. |
|---|---|
| Tuna and sardine stickwater concentrate | 70.00 |
| Calcium hydroxide | 0.70 |
| Water | 1.05 |
| Crude fish oil | 30.00 |

Example 3

| | Gm. |
|---|---|
| Tuna and sardine stickwater concentrate | 75.00 |
| Calcium hydroxide | 0.75 |
| Water | 1.12 |
| Crude fish oil | 25.00 |

Example 4

| | Gm. |
|---|---|
| Tuna stickwater concentrate | 68.00 |
| Calcium hydroxide | 0.68 |
| Water | 1.02 |
| Crude fish oil | 32.00 |

The stickwater concentrates of the above and following examples contained approximately 50% total solids. The above examples illustrate the wide variation in proportions between the concentrate and fatty material, fish oil in these cases.

Example 5

| | Gm. |
|---|---|
| Tuna stickwater concentrate | 50.00 |
| Calcium hydroxide | 0.50 |
| Water | 0.75 |
| Crude soybean oil | 50.00 |

Example 6

| | Gm. |
|---|---|
| Tuna stickwater concentrate | 68.00 |
| Calcium hydroxide | 0.68 |
| Water | 1.02 |
| Crude soybean oil | 32.00 |

The following fats may be substituted in the above formulas: crude cotton seed oil, crude coconut fat, acidulated corn foots, acidulated soybean foots, acidulated coconut foots, and mixtures of these in any proportion.

An example of a mixed fat formulation is as follows:

Example 7

| | Gm. |
|---|---|
| Mixed fish concentrates (70% tuna stickwater and 30% hydrolysate) | 68.00 |
| Calcium hydroxide | 0.68 |
| Water | 1.02 |
| Fats: | |
| Crude coconut fat | 16.00 |
| Crude fish oil | 8.00 |
| Acidulated soybean foots, crude soybean oil, animal lard and tallow | 8.00 |

Example 8

| | Gm. |
|---|---|
| Mixed fish concentrates (70% tuna stickwater and 30% hydrolysate) | 58.00 |
| Calcium hydroxide | 0.58 |
| Water | 0.87 |
| Fats: | |
| Crude soybean oil | 16.00 |
| Acidulated corn foots | 8.00 |
| Crude fish oil | 8.00 |
| Water | 10.00 |

The hydrolysate of Examples 7 and 8 was prepared in accordance with Example 4 of my said copending application Serial No. 428,363, now U. S. Patent No. 2,806,790, as follows: 500 parts of raw tuna viscera and 500 parts of cooked tuna offal were added to each other and passed through a meat grinder. The ground mixed material fell into a hopper to which 335 parts of water were gradually added, and the whole mixture was pumped to a steam jacketed kettle. Agitation of the mixture was started at the beginning of the filling of the kettle and it was maintained during the whole of the digestion period. When the kettle was filled, steam was turned into the jacket and the mixture heated to 50° C. This temperature was maintained for the primary period of digestion. The hydrogen ion concentration was gradually changed (over a period of about 1 hour) from pH 6.0 to pH 8.0 with 50% sodium hydroxide solution. The total primary digestion was for a period of 4 hours. At the end of this period the bones were separated from the soluble and finely suspended organic matter and the oil by pumping the mixture from the kettle first through a revolving screen to take out large-sized bone particles and then through a basket centrifuge operating at 200 R. P. M. to remove the fine bone particles. The bone-free material was then pumped to another tank through a heat exchanger to raise the temperature again to 50° C. for a continued digestion period of 18 hours. This temperature was maintained by recirculation through the heat exchanger. At the end of the secondary period the hydrolysate was rapidly heated to 80° C. by means of the heat exchanger and immediately passed through a high speed De Laval centrifuge to separate the oil from the aqueous solution.

A formulation including molasses is as follows:

Example 9

| | Gm. |
|---|---|
| Tuna stickwater concentrate | 48.00 |
| Calcium hydroxide | 0.48 |
| Water | 0.72 |
| Molasses—cane | 20.00 |
| Fats: | |
| Crude coconut fat | 16.00 |
| Crude fish oil | 8.00 |
| Acidulated soybean foots, crude soy oil, animal lard and tallow | 8.00 |

Various changes may be made in the proportions of the different fats making up the total fat content, and the different fats may be substituted for each other and for the fish oil. The solid fats such as coconut and acidulated cotton seed foots may be used only when dissolved in a liquid fat or fatty acid. Corn, olive and cotton seed oil yield a more fluid emulsion at lower temperatures. It should be further noted that carrot and beet molasses may be substituted for cane. Moreover, acetic acid may be substituted for a part of one of the fatty materials, as indicated by the following example:

*Example 10*

| | Gm. |
|---|---|
| Fish concentrates (tuna and sardine stickwater) | 53.50 |
| Calcium hydroxide | 0.53 |
| Water | 0.80 |
| Molasses | 20.00 |
| Acetic acid 2.5 gm., coconut fat 8.0, crude fish 8.0, acidulated soybean oil foots 8.0 | 26.50 |

The following Example 11 illustrates an emulsion in which the fish concentrate phase consists solely of a hydrolysate prepared in accordance with Example 4 of my said copending application Serial No. 428,363, now U. S. Patent No. 2,806,790, as set forth immediately following Example 8 here and above:

*Example 11*

| | Gm. |
|---|---|
| Hydrolysate alone (50% T. S.) | 96.00 |
| Calcium hydroxide | 0.96 |
| Water | 1.44 |
| Molasses—cane | 40.00 |
| Fats: | |
| Crude coconut | 32.00 |
| Acid soybean foots | 16.00 |
| Crude fish oil | 16.00 |
| | 64.00 |

The following Example 12 illustrates the process and product as applied to pilot plant scale production:

*Example 12*

| | Lb. |
|---|---|
| Fish concentrates | 384.00 |
| Calcium hydroxide | 3.85 |
| Water | 5.75 |
| Cane molasses | 160.00 |
| Crude fish oil | 64.00 |
| Crude coconut fat | 128.00 |
| Acidulated cotton seed oil foots | 64.00 |

The fish concentrates consisted of a mixture of 50% tuna fish stickwater concentrate refined in accordance with the acid treatment of Lassen Patent No. 2,372,677, and 50% fish hydrolysate, each containing 50% total solids. The hydrolysate was prepared in accordance with Example 4 of my said copending application Serial No. 428,363 as described above following Example 8.

To the fish concentrates was added the slurry of calcium hydroxide and water, and the whole agitated until emulsification was completed. The molasses was run into the fish concentrates and thoroughly mixed.

The fats were blended together in a separate tank, and then pumped into the tank containing the emulsified fish concentrate-molasses mixture.

The premixing of all the ingredients was done by means of a vertical mixer with two sets of three blades, one operating near the bottom of the tank, and the other just under the surface of the mixture. The former pushed the liquids upward and the latter downward. The mixture was run through a $\frac{1}{32}$-inch screen enroute to the homogenizer.

The final mixing was completed by passing the premixed material through a Gaulin homogenizer at a pressure of 3500 pounds to the square inch. The resulting fluid, stabilized, homogeneous product was pumped, stored in drums, and then transported 500 miles without separation.

The emulsion of Example 12 was tested for keeping quality. The method of analysis was the active oxygen method (A. O. M.), which consisted of bubbling air continuously through the sample for 103 hours at a temperature of 97° C. No rancidity could be detected.

The following Example 13 illustrates industrial plant production:

*Example 13*

| | Lb. |
|---|---|
| Fish concentrates | 34,702.00 |
| Calcium hydroxide | 347.00 |
| Water | 520.00 |
| Cane molasses | 14,460.00 |
| Crude fish oil | 5,784.00 |
| Acidulated soybean oil soapstock | 5,784.00 |
| Crude coconut fat | 11,567.00 |
| Total weight | 73,164.00 |

About 8,000 gallons, or one railroad tank car.

The fish concentrates consisted of 70% tuna fish stickwater concentrate refined in accordance with the acid treatment of Lassen Patent No. 2,372,677, and 30% fish hydrolysate, each containing 50% total solids. The hydrolysate was prepared in accordance with Example 4 of my said copending application Serial No. 428,363 as described above following Example 8. To this was added the calcium hydroxide and water in the form of a slurry, and emulsification completed by agitation. The molasses was then run into the treated concentrates and thoroughly mixed.

The fats were mixed together in a separate tank and then pumped into the tank containing the emulsified fish concentrates-molasses mixture.

The premixing of these large volumes was accomplished by means of two separate agitators. One, a screw propeller type situated horizontally about 18 inches from the bottom of the circular tank and the same distance from the circumference. The other one, a high speed vertical mixer with two sets of three blades was fixed at the top of the 10,000 gallon tank. The lower set of blades on the shaft operated about 18 inches above the bottom of the mixture, and the upper sets about 12 inches under the surface, the former pushing the liquid upward and the latter downward. The turbulence thus created with this opposing motion plus the forward thrust motion of the propeller provided conditions for satisfactory premixing. The mixture was run through a $\frac{1}{32}$-inch screen enroute to the homogenizer.

The premixed material was passed through a Cherry-Burrell viscolizer at a pressure of 3500 pounds per square inch. The fluid, stabilized emulsion was discharged at a rate of about 800 gallons per minute, and pumped into a 10,000 gallon tank.

By this process over 1,000,000 pounds of the emulsion have been made to date, with the various mixtures of fish concentrates made from sardine, mackerel, tuna, anchovy, and concentrated fish hydrolysates.

Shipments have been made by tank truck, in drums by rail for 1500 miles, and by ocean steamship for 2000 miles, without causing the emulsion to break.

The emulsion of Example 13 was tested for keeping quality. The method of analysis was the active oxygen method (A. O. M.), which consisted of bubbling air continuously through the sample for 100 hours at a temperature of 97° C. No rancidity could be detected.

The emulsion made by the process outlined in Example 12 was tested on chicks and compared with a ration containing animal fat. All other conditions were kept constant except that the animal fat contained antioxidant, the emulsion did not. Results indicated that the emulsion was at least equal to animal fat.

In another chick experiment, results were similar when acidulated soybean oil foots was substituted for acidulated cotton seed oil foots.

Example 14

The emulsion consisted of the following ingredients prepared as in Example 1:

|  | Gm. |
|---|---|
| Emulsified tuna stickwater concentrate | 240.00 |
| Molasses | 100.00 |
| Crude coconut fat | 80.00 |
| Acidulated soybean oil foots | 40.00 |
| Crude fish oil | 40.00 |

Vitamin A acetate and calcium pantothenate were added to the crude coconut fat, and vitamin $B_{12}$ was added to the fish concentrate prior to mixing.

After 28 days' storage at 25° C., results of analyses outlined below show that the original potency of the vitamins remains satisfactory for all practical purposes:

| Beginning | Stored Frozen | Stored at 25° C. |
|---|---|---|
| Vitamin A—100 gm.—10,900 USP units. | 10,100 | 10,200. |
| Calcium pantothenate—100 gm.—24.4 mg. | 25.8 mg. | 23.5 mg. |
| Vitamin $B_{12}$—100 gm.—19.8 micrograms. | 22.0 micrograms | 20.0 micrograms. |

From the above description it will be understood to those skilled in the art that an emulsion product having many advantages has been provided. Among these advantages of the invention are the following:

(1) Emulsion is fluid at about 20° C., and even at 2° C. when made with fats which are liquid below this temperature.

(2) Emulsion combines all the nutritive properties of the fish concentrates and the fats and other carbonaceous compounds, in one homogeneous mixture.

(3) Emulsion contains a greater variety of fatty acids to suit specific metabolic requirements of different animals.

(4) Emulsion components may be applied to dry feed in one operation.

(5) The low temperature setting point greatly reduces the need for expensive mill equipment.

(6) Emulsion is water dispersible and, therefore, the pipelines are easily cleaned at a comparatively low temperature.

(7) Permits storage and transportation under temperature conditions which would cause animal fats to solidify.

Having fully described my invention, it is to be understood that I do not wish to be limited to the details set forth, but my invention is of the full scope of the appended claims.

I claim:

1. In a process for the production of an emulsified, fluid animal food product, the steps comprising adding to an aqueous fish concentrate a calcium compound dispersing agent in a minor amount but in an amount effective to retain the fish solids in stable suspension, and thoroughly mixing therewith a fatty material.

2. The process as defined in claim 1 wherein said aqueous fish concentrate is a refined fish stickwater concentrate.

3. In a process for the production of an emulsified, fluid animal food product, the steps comprising adding to an aqueous fish concentrate a calcium compound dispersing agent in a minor amount but in an amount effective to retain the fish solids in stable suspension, and thoroughly mixing therewith a fatty material and molasses.

4. The process as defined in claim 3 wherein said aqueous fish concentrate is a refined fish stickwater concentrate.

5. In a process for the production of an emulsified, fluid animal food product, the steps comprising adding to an aqueous fish concentrate a calcium compound dispersing agent in a minor amount but in an amount effective to retain the fish solids in stable suspension, thoroughly mixing therewith a fatty material, and homogenizing the mixture under pressure.

6. The process as defined in claim 1 wherein said calcium compound is calcium hydroxide.

7. The process as defined in claim 6, wherein said aqueous fish concentrate is a refined fish stickwater concentrate.

8. In a process for the production of an emulsified, fluid animal food product, the steps comprising adding to an aqueous fish concentrate calcium hydroxide in a minor amount but in an amount effective to retain the fish solids in stable suspension, and thoroughly mixing therewith a fatty material and molasses.

9. The process as defined in claim 8 wherein said aqueous fish concentrate is a refined fish stickwater concentrate.

10. In a process for the production of an emulsified, fluid animal food product, the steps comprising adding to an aqueous fish concentrate calcium hydroxide in a minor amount but in an amount effective to retain the fish solids in stable suspension, thoroughly mixing therewith a fatty material, and homogenizing the mixture under pressure.

11. An emulsified, fluid animal food composition comprising fish stickwater concentrate containing about 50% solids, a calcium compound dispersing agent selected from the group consisting of calcium hydroxide, calcium chloride, calcium carbonate, calcium acetate and calcium lactate in a minor amount but in an amount effective to retain the fish solids in stable suspension, and a fatty material.

12. An emulsified, fluid animal food composition comprising fish stickwater concentrate containing about 50% solids, a calcium compound dispersing agent in a minor amount but in an amount effective to retain the fish solids in stable suspension, a fatty material and molasses.

13. The composition as defined in claim 11 wherein said calcium compound is calcium hydroxide.

14. The composition as defined in claim 12 wherein said calcium compound is calcium hydroxide.

15. An emulsified, fluid animal food product comprising an aqueous fish concentrate, a fatty material and calcium hydroxide in an amount effective to retain the fish solids in stable suspension.

References Cited in the file of this patent

UNITED STATES PATENTS 2,566,549   Beckwith  Sept. 4, 1951